(12) United States Patent
Gerez et al.

(10) Patent No.: US 8,560,272 B2
(45) Date of Patent: Oct. 15, 2013

(54) METHOD AND SYSTEM FOR MONITORING A TURBOJET ENGINE

(75) Inventors: Valerio Gerez, Yerres (FR); Julien Griffaton, Paris (FR); Gregory Guillemand, Moissy Cramayel (FR)

(73) Assignee: SNECMA, Paris (FR)

( * ) Notice: Subject to any disclaimer, the term of this patent is extended or adjusted under 35 U.S.C. 154(b) by 267 days.

(21) Appl. No.: 13/120,663

(22) PCT Filed: Oct. 9, 2009

(86) PCT No.: PCT/FR2009/051930
§ 371 (c)(1),
(2), (4) Date: Mar. 24, 2011

(87) PCT Pub. No.: WO2010/040966
PCT Pub. Date: Apr. 15, 2010

(65) Prior Publication Data
US 2011/0178772 A1 Jul. 21, 2011

(30) Foreign Application Priority Data
Oct. 10, 2008 (FR) ...................... 08 56855

(51) Int. Cl.
*G06F 11/30* (2006.01)

(52) U.S. Cl.
USPC ........... 702/184; 702/183; 702/185; 702/189; 702/35

(58) Field of Classification Search
USPC ........................... 702/56, 145, 184
See application file for complete search history.

(56) References Cited

U.S. PATENT DOCUMENTS

| | | | |
|---|---|---|---|
| 4,437,163 A | 3/1984 | Kurihara et al. | |
| 4,453,407 A | 6/1984 | Sato et al. | |
| 5,943,634 A | 8/1999 | Piety et al. | |
| 6,477,472 B2* | 11/2002 | Qian et al. | 702/35 |
| 6,499,350 B1 | 12/2002 | Board et al. | |
| 6,768,938 B2 | 7/2004 | McBrien et al. | |
| 7,908,095 B2* | 3/2011 | Liu et al. | 702/34 |
| 2004/0176902 A1 | 9/2004 | McBrien et al. | |
| 2005/0199064 A1 | 9/2005 | Wen et al. | |
| 2007/0250245 A1 | 10/2007 | Van Der Merwe et al. | |

FOREIGN PATENT DOCUMENTS

| | | |
|---|---|---|
| WO | 97 43729 | 11/1997 |
| WO | 01 75272 | 10/2001 |

OTHER PUBLICATIONS

U.S. Appl. No. 13/508,172, filed May 4, 2012, Griffaton.
International Search Report issued Feb. 18, 2010 in PCT/FR09/51930 filed Oct. 9, 2009.

\* cited by examiner

*Primary Examiner* — Mischita Henson
(74) *Attorney, Agent, or Firm* — Oblon, Spivak, McClelland, Maier & Neustadt, L.L.P.

(57) ABSTRACT

A method and a system for monitoring a turbojet engine. The method acquires a signal representative of a vibratory level of an operating rotor of the turbojet engine, acquires a rotation speed of the rotor during operation, compares the amplitude of the signal with at least one predetermined threshold based on the rotor rotation speed and, in event an amplitude peak exceeds the threshold, analyzes the signal over a time slot defined around the amplitude peak to determine if the phenomenon at the origin of the amplitude peak is a mechanical shock undergone by the rotor of the turbojet engine or an electronic interference of the signal.

10 Claims, 6 Drawing Sheets

METHOD AND SYSTEM FOR MONITORING A TURBOJET ENGINE

BACKGROUND OF THE INVENTION

The present invention relates to the general field of monitoring a turbojet. More particularly, it relates to a method and a system making it possible automatically to detect that an airplane turbojet in flight has ingested an object.

In flight, it is possible for foreign bodies or component parts of the turbojet to be ingested by the turbojet and to give rise to damage inside it. In particular, the impact of an object against a fan blade runs the risk of damaging it. In the event of damage due to ingestion of bodies that are foreign to the turbojet (e.g. birds), the term used is foreign object damage (FOD). In the event of damage due to ingesting component parts of the turbojet (e.g. rivets, bolts, etc.), the term used is domestic object damage (DOD).

Various known solutions exists for detecting the presence of FOD or DOD. One of those solutions is based on measuring the vibration of a rotor of the turbojet in order to detect the appearance of unbalance following damage thereto by ingesting an object. In the event of unbalance being detected, the turbojet is subjected to visual inspection on the ground (e.g. by endoscopy): the presence of traces of an impact, bird feathers, or perforations in the blades at the location of the impact then make it possible to diagnose the presence of FOD or DOD.

Nevertheless, such a solution presents numerous drawbacks. In particular, it is not capable of detecting the presence of FOD or DOD that does not lead to any unbalance of the turbojet rotors (or to an unbalance that is too small to be detected). Furthermore, visual inspection of the turbojet requires intervention on the ground that needs to be programmed in advance and that can be time consuming.

Another known solution consists in using measurement instruments on board the airplane (such as radar) for detecting the presence of FOD or DOD. That solution nevertheless presents the drawback of requiring additional instrumentation that is expensive, compared with the expected saving, and that makes the airplane heavier.

Document US 2007/0250245 discloses a method of monitoring a turbojet that makes it possible to detect almost instantaneously whether a foreign body has damaged the turbojet. That method provides for real time comparison between the vibration level of a turbojet rotor and a predefined threshold. In the event of that threshold being crossed for a predetermined duration, then a maintenance warning is issued.

Nevertheless, that method presents numerous disadvantages. In particular, it is limited to detecting those kinds of FOD or DOD that give rise, at least temporarily, to deformation of a fan blade (the method processes only reduced vibratory data). A simple impact caused by ingesting a body without deforming a fan blade (whether temporarily or permanently) is therefore not detected by that method. Furthermore, in order for a maintenance warning to be issued, it is necessary for the threshold to be exceeded over some minimum duration. There is therefore a risk that certain kinds of FOD or DOD will not be detected by that method. Finally, the method does not make provision for avoiding false alerts by eliminating electronic disturbances from the signal.

Document U.S. Pat. No. 6,907,368 discloses a method of detecting the ingestion of component parts (DOD) by applying Fourier transform analysis to a signal representative of turbojet noise in operation. Although effective in detecting the presence of DOD, that method presents the drawback of not being able to avoid false alerts caused by disturbances that are not the result of ingesting component parts.

OBJECT AND SUMMARY OF THE INVENTION

A main object of the present invention is thus to mitigate such drawbacks by proposing to detect FOD and DOD automatically and reliably even if the FOD or DOD has not given rise to unbalance in one of the rotors of the turbojet or to deformation of a fan blade.

This object is achieved by a method of monitoring a turbojet, the method consisting in:
acquiring a signal representative of a vibratory level of a rotor during operation of the turbojet;
acquiring a speed of rotation of the rotor in operation;
comparing the amplitude of the signal with at least one vibratory threshold that is predetermined as a function of the speed of rotation of the rotor; and
in the event of the threshold being crossed by an amplitude peak, analyzing the signal over a defined time window on either side of the amplitude peak in order to determine whether the phenomenon giving rise to the amplitude peak is a mechanical impact against the turbojet rotor or an electronic disturbance of the signal.

The method of the invention includes a step of analyzing the signal after detecting that an amplitude peak has crossed the vibratory threshold. This step serves to determine that the phenomenon giving rise to the amplitude peak was indeed a mechanical impact against the rotor of the turbojet and not a mere electronic disturbance of the signal. This serves to avoid any false alerts.

Furthermore, the method of the invention makes it possible to detect a wide range of phenomena that might give rise to an amplitude peak: there is thus no need for the object ingested by the turbojet to give rise to an unbalance or to give rise to deformation (even temporary deformation) of a fan blade in order to be detected.

More generally, the method of the invention enables a maintenance message to be issued in order to cause the real damage generated by the turbojet ingesting an object to be inspected visually (e.g. at the end of the flight) without it being necessary to wait for a maintenance inspection that has been scheduled in advance. It is thus possible to avoid long-term deterioration in the performance of the turbojet by identifying as quickly as possible the damage caused as a result of ingesting an object.

Finally, the method of the invention may be implemented by means of measurement instruments (in particular accelerometers) and data acquisition systems (in particular the electronic computer) that are already present on most airplanes or on most turbojets themselves.

The step of analyzing the signal over the time window may comprise analyzing the symmetry of the signal. Alternatively or in addition, the step of analyzing the signal over the time window may also comprise modeling the decrease in the signal after the amplitude peak. When modeling the decrease in the signal, the step of analyzing the signal over the time window consists in calculating a difference between the curve plotting the averages of the amplitudes of a spectrogram of the signal at each instant over the time window, with an exponential model of that curve.

Advantageously, the predetermined vibration threshold comprises high and low values for the signal over different ranges of rotor rotation speed.

According to an advantageous provision, the method consists, after determining that there has been a mechanical impact against the rotor of the turbojet, in determining whether an unbalance has appeared in the rotor following the mechanical impact.

Under such circumstances, the step of determining that an unbalance has appeared in the rotor may consist in: making a spectrogram of the signal over the time window; calculating the average of the amplitudes of the spectrogram at each instant; calculating the difference in the levels of the average before and after the amplitude peak; and comparing the difference in level with a predetermined level threshold.

Preferably, the steps of acquiring the signal and the speed of rotation of the rotor are performed continuously during an operating cycle of the turbojet.

Also preferably, the steps of acquiring the signal and the speed of rotation of the rotor, and the step of comparing the amplitude of the signal are performed in real time, while the step of analyzing the signal is performed in deferred time.

Also preferably, a maintenance message is issued if it is determined that the phenomenon giving rise to the vibratory event is a mechanical impact against the rotor of the turbojet. The maintenance message may be issued during a flight to maintenance crews at the airplane's destination. Thus, visual inspection following the detection of the mechanical impact may be prepared in advance so that the length of time the airplane is grounded in order to perform the inspection can be optimized.

The invention also provides a system for monitoring a turbojet, the system comprising means for acquiring a signal representative of a vibratory level and of the speed of rotation of a rotor of the turbojet in operation, means for comparing the amplitude of the signal with at least one vibratory threshold predetermined as a function of the speed of rotation of the rotor, and means for analyzing the signal over a time window, which means are activated in the event of the threshold being crossed by an amplitude peak, in order to determine whether the phenomenon giving rise to the amplitude peak was a mechanical impact against the rotor of the turbojet or an electronic disturbance to the signal.

The invention also provides a turbojet including a monitoring system as defined above.

BRIEF DESCRIPTION OF THE DRAWINGS

Other characteristics and advantages of the present invention appear from the following description made with reference to the accompanying drawings that show an implementation having no limiting character. In the figures.

DETAILED DESCRIPTION OF AN IMPLEMENTATION

The surveillance method and system of the invention make it possible to detect automatically when an airplane turbojet has ingested an object (foreign body or component part of the turbojet) while in flight.

The method relies on analyzing raw time signals coming from vibration sensors (of the accelerometer type) that are typically installed in a turbojet in order to perform traditional vibratory monitoring functions.

In known manner, such vibration sensors serve to measure the vibration levels emitted by one of the rotors of the turbojet while it is in operation. They are connected for signal processing purposes to an electronic computer known as an engine monitoring unit (EMU) that may be present in the airplane (e.g. in the hold) or that may be fitted directly to the turbojet.

Figure 1:
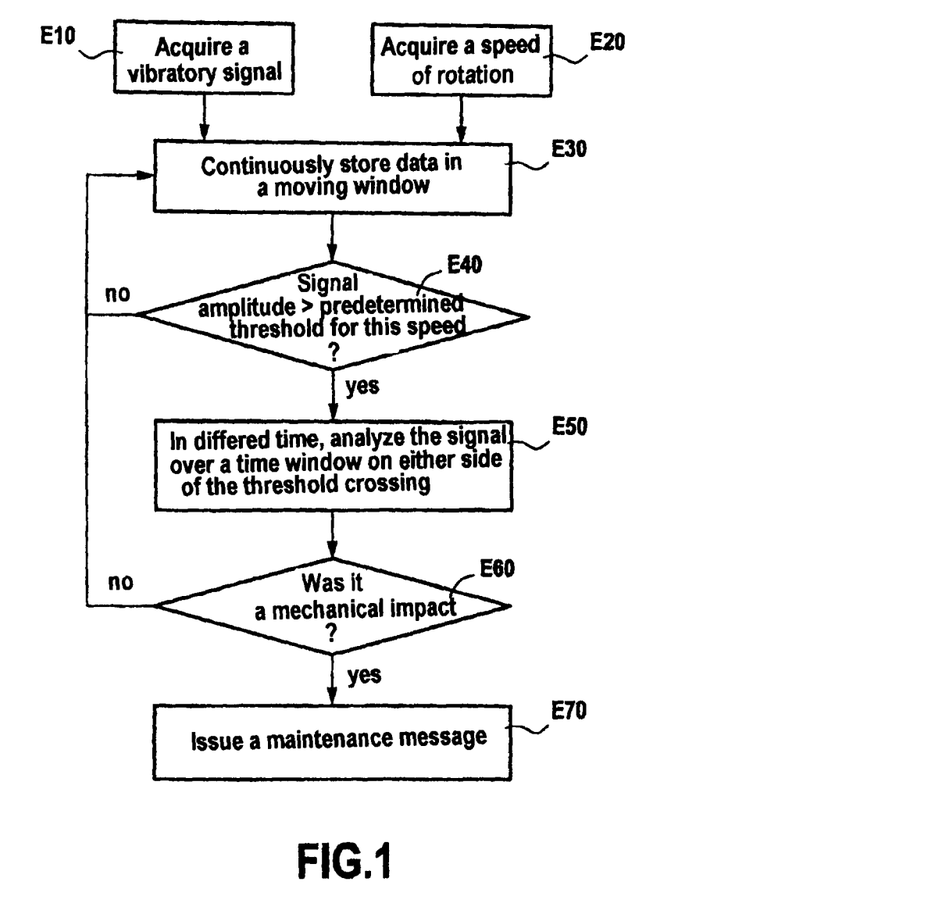
FIG. 1 is a flow chart showing the main steps of the method of the invention.

With reference to FIG. 1, the surveillance method of the invention consists initially, while in flight and in real time, in acquiring the signals coming from vibration sensors (step E10), and also the speed of rotation of the rotor (step E20).

The signals coming from the vibration sensors are said to be acquired in real time, to indicate that the signals received by the sensors are immediately transmitted to the turbojet electronic computer for processing while in flight, it nevertheless being possible for a small time offset to remain between the moment at which the vibration occurred and the moment at which the signals are converted by the electronic computer for processing.

The speed of rotation of the rotor in flight is acquired (step E20) for example by converting the signal from a tachometer probe mounted on the rotor (such a probe possibly already being present on the turbojet). In particular, this acquisition may be performed at a sampling frequency that is much lower than the sampling frequency for the signals coming from the vibration sensors.

The data acquired in this way (signals from the vibration sensors and rotor speed of rotation) is then stored temporarily on a continuous basis while in flight (step E30).

The following step (E40) consists in comparing the amplitude of the signals coming from the vibration sensors with at least one vibration threshold predetermined as a function of the speed of rotation of the rotor. This step is also performed in real time while in flight.

If an amplitude peak exceeds the threshold, then a step E50 is provided for analyzing the signal over a defined time window around the amplitude peak.

This analysis step E50 serves to determine that the phenomenon giving rise to the amplitude peak is indeed a mechanical impact to which the turbojet rotor has been subjected as a result of ingesting an object, and is not merely an electronic disturbance of the signal (E60).

In the event of the rotor being subjected to a mechanical impact, a maintenance message may be issued (step E70), e.g. to the maintenance crew on the ground, in order to request visual inspection of the turbojet so as to evaluate any damage the turbojet might have suffered. In the event of a near electronic disturbance to the signal, no action is undertaken and the method continues.

The signal analysis step (E50), the step (E60) of determining the origin of the amplitude peak and the step (E70) of issuing a maintenance message are preferably implemented by the EMU electronic computer which possesses appropriate signal processor means. Nevertheless, they could be implemented in a computer on the ground. Under such circumstances, the signal data needs to be transmitted to the computer on the ground, either during the flight, or after the airplane has landed.

Furthermore, the signal analysis step E50 is performed in deferred time (in contrast to real time analysis). It is preferably performed at any time during the flight prior to the airplane landing and it takes place in parallel with acquisition of the signal and of the speed of rotation of the rotor and also with comparison of the signal with the predetermined vibration threshold.

An implementation of certain steps of the monitoring method of the invention is described below.

Figure 2:
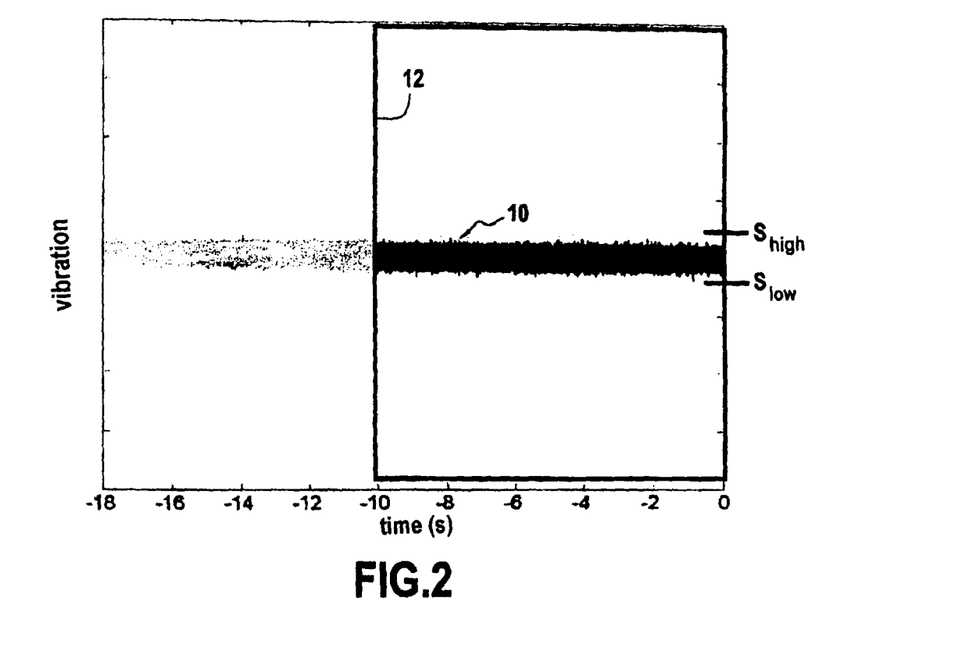
FIGS. 2, 3, 4A, 4B, 5A, 5B, 6A, 6B, 7, and 8 show an implementation of the method of the invention.

FIG. 2 thus represents an example of a time signal 10 representative of a level of vibration of a rotor while the turbojet is in operation and as delivered by a vibration sensor. FIG. 2 shows the signal after conversion by the electronic computer EMU.

The signal 10 is recorded continuously in flight over a moving time window 12 of duration that is of the order of about 10 seconds, for example. In known manner, a moving time window serves to "track" the signal, and to record it continuously over a fixed period as the signal is being acquired. This moving window is stored in a memory forming part of the electronic computer EMU.

FIG. 2 also shows two lines representative of a high value $S_{high}$ and of a low value $S_{low}$ of the signal for some particular speed of rotation of the rotor.

These values define predetermined thresholds for the signal corresponding to "normal" operation of the turbojet, i.e. to operation of a turbojet that has not suffered any ingestion of objects. They are evaluated on the basis of vibratory data taken from one or more turbojets forming part of the same family or several different families and they are obtained during tests performed on the ground or in flight. Preferably, these values are taken from data recorded in flight on turbojets of a single family.

Figure 3:
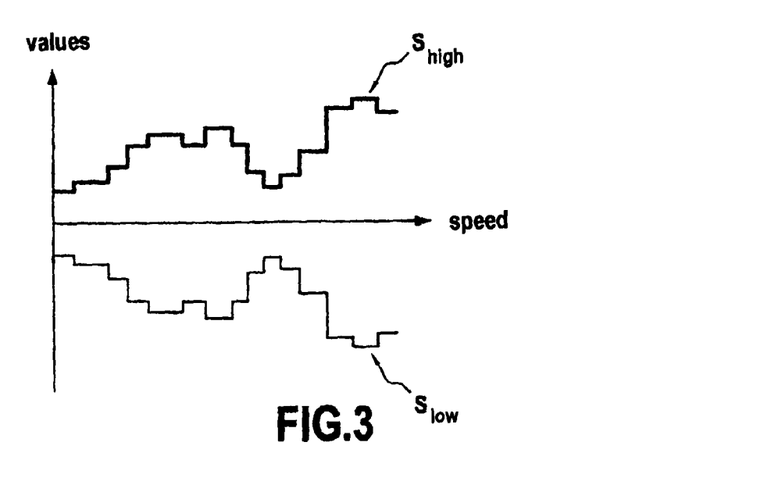

As shown in FIG. 3, the maximum and minimum values $S_{high}$ and $S_{low}$ defining the thresholds depend on the speed of rotation of the turbojet rotor. In this figure, these values are defined over various short ranges of rotor rotation speed.

During the step E40 of the method (FIG. 1), the amplitude of the signal recorded over the moving time window is compared continuously (i.e. without interruption) with the high and low values defining the predetermined threshold of the signal for the rotor speed of rotation under consideration.

This comparison step which is performed by the electronic computer EMU serves to detect any crossing of the predetermined threshold by an amplitude peak of the signal. In FIG. 3, an amplitude peak of the signal crossing $S_{high}$ (positive values) or $S_{low}$ (negative values) must be detected immediately.

In the event of a threshold being crossed by an amplitude peak, the electronic computer EMU causes both the time window that precedes the threshold crossing and the time window that immediately follows said threshold crossing to be stored. Thus, as shown in FIGS. 4A and 4B, a time window 14 centered on the amplitude peak (respectively 16 or 18) is stored (with the duration of the window being of the order of 20 seconds, for example).

Figure 4A:
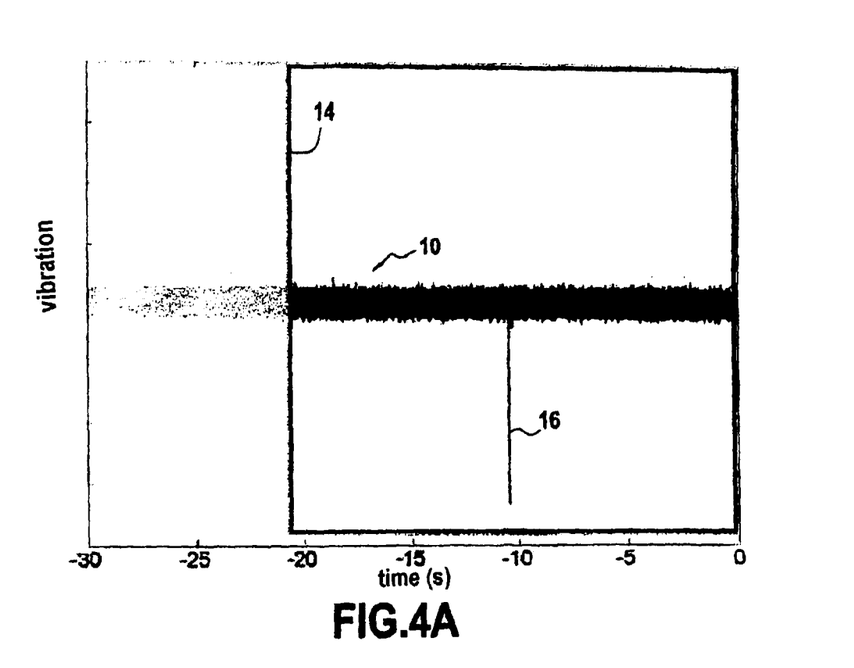
Figure 4B:
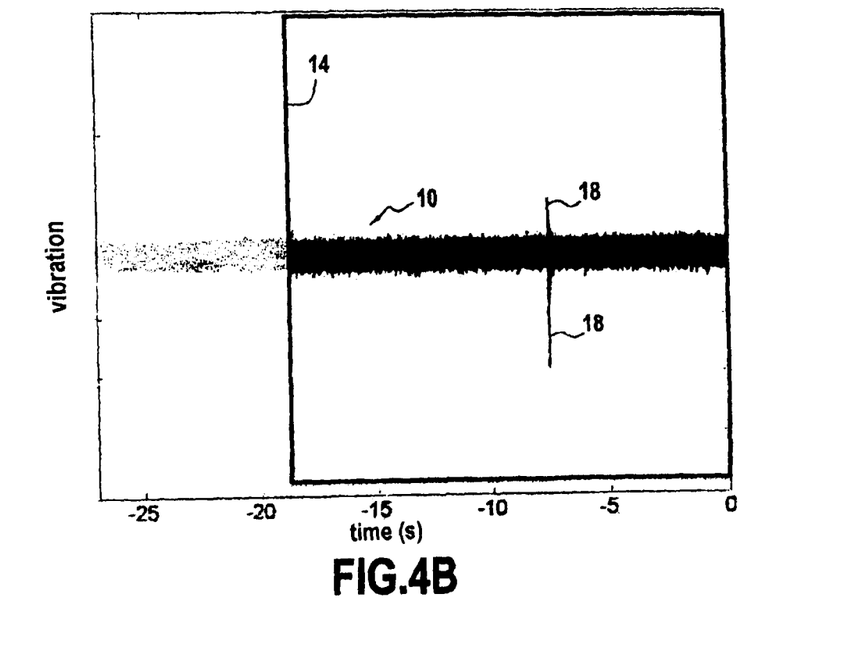

FIGS. 4A and 4B show two different types of threshold crossing: the amplitude peak 16 of FIG. 4A is representative of an electronic disturbance to the signal (e.g. as a result of interference with other electronic components), whereas the amplitude peaks 18 in FIG. 4B are representative of the turbojet ingesting an object (a foreign body or a component part of the turbojet).

The analysis step described below serves to distinguish between these two types of event.

Two methods may be used (as alternatives or one after the other) in order to distinguish between a mechanical impact to which the rotor has been subjected and a mere electronic disturbance of the signal (also known as an "outlier", i.e. an observation that is atypical). These methods are implemented using the calculation means of the electronic computer EMU.

One of these methods consists in automatically studying the symmetry of the amplitude peak relative to the axis of symmetry of the observed signal. Various tests have revealed that a mechanical impact against the turbojet rotor generally gives rise to an amplitude peak that is substantially symmetrical, whereas an electronic disturbance of the signal is not necessarily symmetrical.

Studying the symmetry of the amplitude peak may consist, for example, in verifying whether the following condition is satisfied:

$$S = \frac{\text{Min}(|M|,|m|)}{\text{Max}(|M|,|m|)} \geq c$$

where "M" is the positive maximum value taken by the amplitude peak, "m" is the minimum negative value taken by the amplitude peak, and "c" is a parameter that is predetermined by the manufacturer.

If the above condition is satisfied, it is considered that the crossing of the threshold by the amplitude peak is probably not due to an electronic disturbance of the signal.

Naturally, other conditions for evaluating could be devised that would make it possible to determine automatically whether the amplitude peak is or is not symmetrical.

The other method suitable for distinguishing between a mechanical impact against the rotor and a mere electronic disturbance of the signal consists in determining whether the signal presents damping following the amplitude peak. A signal representative of a mechanical impact against the rotor always presents damping after the amplitude peak, whereas this is not true of an electronic disturbance of the signal.

Figure 5A:
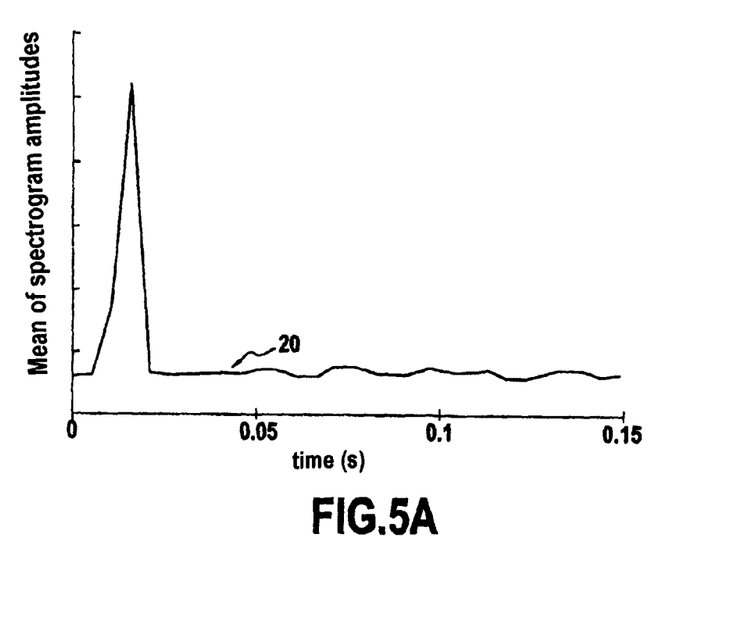
Figure 5B:
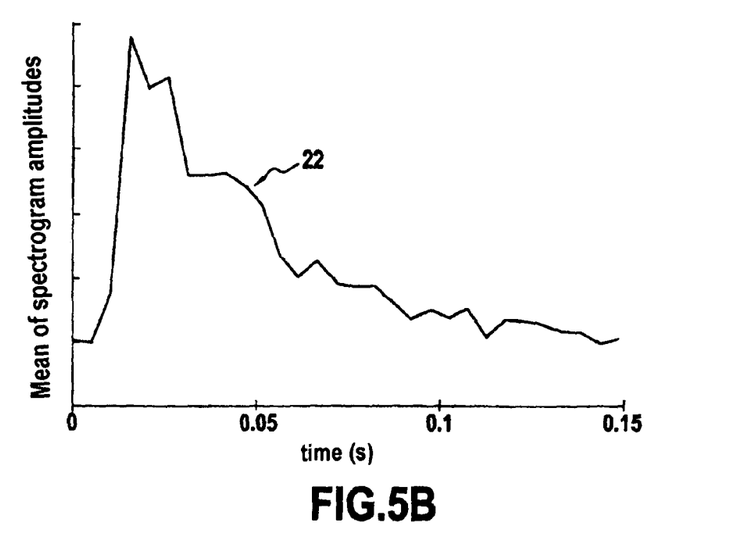

For this purpose, a model of the decrease in the signal after the amplitude peak is evaluated from a spectrogram of the window recorded over the time window (not shown in the figures). The averages at each instant of the amplitudes of the spectrogram are then calculated, thus making it possible to obtain the curves 20 and 22 as shown in FIGS. 5A and 5B, which relate respectively to an electronic disturbance of the signal and to a mechanical impact against the rotor.

Figure 6A:
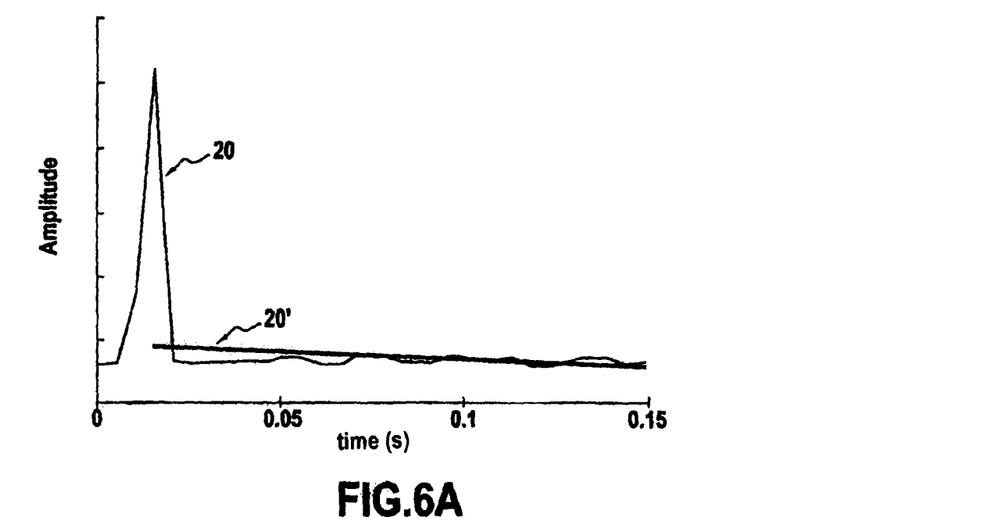
Figure 6B:
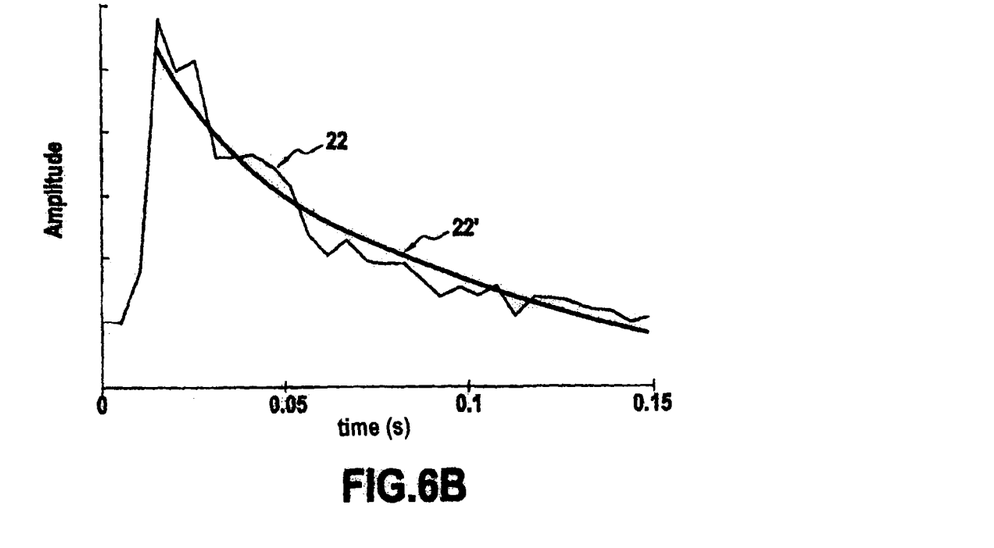

Thereafter, an analysis is made of the similarity of the curve X (where X represents the curve 20 or 22) with an exponential type function that is representative of a damped impact. For this purpose, assuming that the curve 20, 22 may be approximated by a decreasing exponential function of the form $Y=A.e^{-t/\tau}$, a search is made for the coefficients "a" and "b" such that the straight line:

$$\ln(Y)=\ln(A)+(-1/\tau)\times t=a+b\times t$$

represents a good linear approximation, e.g. in a least-squares sense, of the curve ln(X). In FIGS. 6A and 6B, the lines 20' and 22' thus correspond to the linear approximations in the least-squares sense of the curve ln(X), respectively for the electronic disturbance of the signal and for the mechanical impact against the rotor.

While calculating the linear approximation using the least-squares method, the coefficient of determination of the regression line is a measure of the similarity of the curve X with an exponential curve: a minimum threshold for the coefficient of determination then makes it possible to decide whether the curve X is close enough to an exponential, i.e. whether the signal is sufficiently representative of a mechanical impact.

In an advantageous provision of the invention, the method also consists, after determining that the turbojet rotor has been subjected to a mechanical impact, in determining whether an unbalance has appeared in the rotor following the impact. Such an unbalance may be due to partial or total loss of one or more blades that have been hit by the ingested object. It may also be the result of the same blades being punctured.

Figure 7:
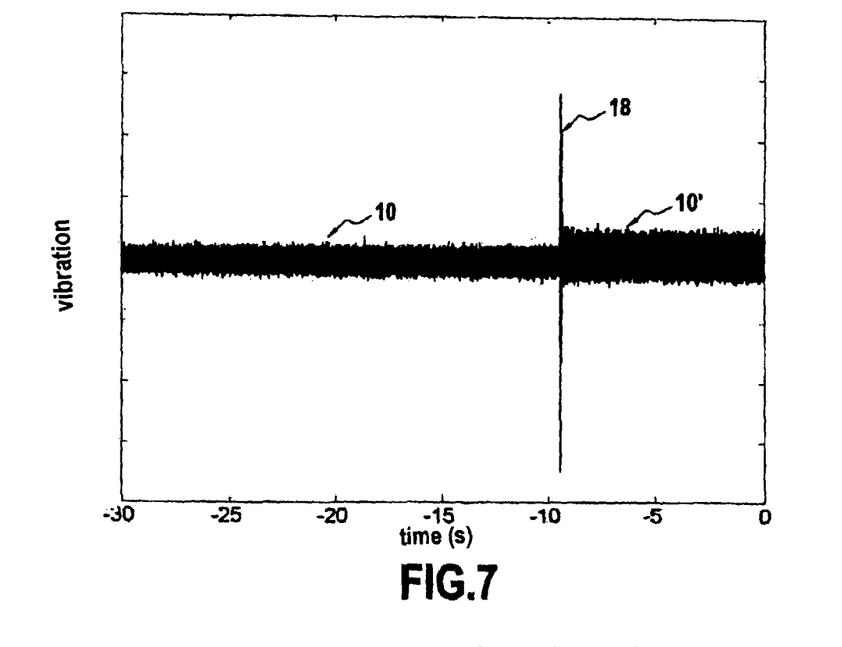

FIG. 7 shows a time signal 10 characteristic of the appearance of an unbalance in the turbojet rotor following a mechanical impact. In this figure, it can be seen that the shape of the signal 10' after the amplitude peak 18 following the mechanical impact against the rotor is different from that of the signal 10 prior to the amplitude peak.

By way of example, a method of determining automatically whether an unbalance has appeared consists in producing a spectrogram of the vibratory signal over the time window centered on the amplitude peak 18. The averages at each instant of the amplitudes of the spectrogram are then calculated, thus making it possible to obtain the curve 24 shown in FIG. 8.

The amplitude averages of the points constituting the curve 24 (also referred to as the level of the average) is then calculated for the period before and after the amplitude peak 18. These averages give rise to two lines 26 and 28 shown in FIG. 8, respectively for the portion of the curve before the amplitude peak and for the portion of the curve after the amplitude peak.

Figure 8:
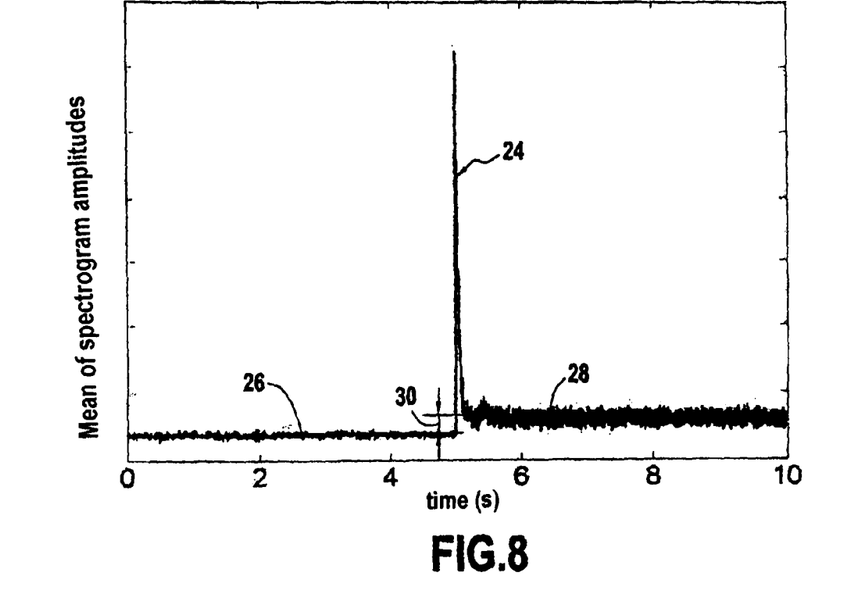

The difference 30 between these two levels is calculated and compared with a predetermined level threshold. If the difference exceeds the level threshold, it can be deduced that an unbalance has occurred in the turbojet rotor following the mechanical impact, and this information may be added to the maintenance message that is issued in order to warn of the presence of an FOD or of a DOD.

As with the vibration threshold, the level threshold used for determining whether an unbalance has appeared is evaluated on the basis of vibratory data taken from one or more turbojets belonging to the same family or to a plurality of different families and obtained during testing performed on the ground or in flight.

The invention claimed is:

1. A method of monitoring a turbojet, the method comprising:
    acquiring a signal representative of a vibratory level of a rotor during operation of the turbojet from a vibration sensor which is connected to an engine monitoring unit;
    acquiring a speed of rotation of the rotor in operation from a tachometer probe mounted on the rotor and connected to the engine monitoring unit;
    comparing, using the engine monitoring unit, an amplitude of the vibratory level signal acquired from the vibration sensor with at least one vibratory threshold that is predetermined as a function of the speed of rotation of the rotor; and
    in event of the threshold being crossed by an amplitude peak, analyzing, using the engine monitoring unit, the vibratory level signal acquired from the vibration sensor over a defined time window on either side of the amplitude peak to determine whether a phenomenon giving rise to the amplitude peak is a mechanical impact against the turbojet rotor or an electronic disturbance of the vibratory level signal acquired from the vibration sensor by analyzing symmetry of the vibratory level signal or by determining whether the vibratory level signal presents damping following the amplitude peak,
    wherein the phenomenon is the mechanical impact if at least one of the amplitude peak being substantially symmetrical or the vibratory level signal presenting damping following the amplitude peak is satisfied, and
    wherein the phenomenon is the electronic disturbance if at least one of the amplitude peak being not symmetrical or the vibratory level signal does not present damping following the amplitude peak is satisfied.

2. A method according to claim 1, wherein the vibratory level signal presenting damping following the amplitude peak is determined by modeling a decrease in the vibratory level signal after the amplitude peak.

3. A method according to claim 2, wherein the analyzing the signal over the time window comprises calculating a difference between a curve plotting averages of amplitudes of a spectrogram of the signal at each instant over the time window, with an exponential model of that the curve plotting averages of amplitudes.

4. A method according to claim 1, wherein the predetermined vibration threshold comprises high and low values for the signal over different ranges of rotor rotation speed.

5. A method according to claim 1, further comprising, after determining that there has been a mechanical impact against the rotor of the turbojet, determining whether an unbalance has appeared in the rotor following the mechanical impact.

6. A method according to claim 5, wherein the determining that an unbalance has appeared in the rotor comprises:
    making a spectrogram of the signal over a time window;
    calculating an average of amplitudes of the spectrogram at each instant;
    calculating a difference in levels of the average before and after the amplitude peak; and
    comparing the difference in level with a predetermined level threshold.

7. A method according to claim 1, wherein the acquiring the signal and the acquiring the speed of rotation of the rotor are performed continuously during an operating cycle of the turbojet.

8. A method according to claim 1, wherein the acquiring the signal, the acquiring the speed of rotation of the rotor, and the comparing the amplitude of the signal are performed in real time, while the analyzing the signal is performed in deferred time.

9. A method according to claim 1, further comprising issuing a maintenance message if it is determined that the phenomenon giving rise to the vibratory event is a mechanical impact against the rotor of the turbojet.

10. A method according to claim 1, wherein the amplitude peak is determined to be substantially symmetrical if the condition $$S = \frac{\text{Min}(|M|, |m|)}{\text{Max}(|M|, |m|)} \geq c$$

is satisfied, where M is a positive maximum value taken by the amplitude peak, m is a minimum negative value taken by the amplitude peak, and c is a predetermined parameter.

* * * * *